United States Patent
Matsuda et al.

(10) Patent No.: US 8,734,918 B2
(45) Date of Patent: May 27, 2014

(54) LIQUID CRYSTAL COATING SOLUTION, AND POLARIZING FILM

(75) Inventors: Shoichi Matsuda, Ibaraki (JP); Kyoko Nishiguchi, Ibaraki (JP); Tadayuki Kameyama, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 979 days.

(21) Appl. No.: 12/531,269

(22) PCT Filed: Oct. 30, 2008

(86) PCT No.: PCT/JP2008/069722
§ 371 (c)(1),
(2), (4) Date: Sep. 14, 2009

(87) PCT Pub. No.: WO2009/084317
PCT Pub. Date: Jul. 9, 2009

(65) Prior Publication Data
US 2010/0039608 A1 Feb. 18, 2010

(30) Foreign Application Priority Data

Dec. 28, 2007 (JP) .................................. 2007-338431
Apr. 22, 2008 (JP) .................................. 2008-110902

(51) Int. Cl.
*C09K 19/00* (2006.01)
*C09K 19/60* (2006.01)
*C09B 31/08* (2006.01)
*G02B 5/30* (2006.01)
*G02F 1/1335* (2006.01)

(52) U.S. Cl.
CPC ............... *C09K 19/601* (2013.01); *C09B 31/08* (2013.01); *G02B 5/3016* (2013.01); *G02F 1/133528* (2013.01); *Y10S 428/91* (2013.01)
USPC ..... 428/1.31; 349/191; 349/194; 252/299.62; 252/585; 359/487.02; 428/910; 534/577

(58) Field of Classification Search
CPC .... C09K 19/601; C09K 19/322; C09B 31/08; C09B 31/053; C09B 29/0014; C09B 35/04; C09B 35/06; G02F 1/133528; G02F 1/133533; G02F 1/1347; G02B 5/3016
USPC ......... 428/1.31, 332, 334, 910; 349/194, 191; 359/487.01, 487.02, 489.01; 252/299.62, 585; 534/577
See application file for complete search history.

(56) References Cited

U.S. PATENT DOCUMENTS

| | | |
|---|---|---|
| 5,340,504 A | 8/1994 | Claussen |
| 5,958,596 A | 9/1999 | Claussen et al. |
| 2004/0232394 A1 | 11/2004 | Khan et al. |
| 2006/0182902 A1 | 8/2006 | Yoneyama et al. |

FOREIGN PATENT DOCUMENTS

| | | |
|---|---|---|
| CN | 1867637 A | 11/2006 |
| JP | 05-098171 A | 4/1993 |
| JP | 7-150088 A | 6/1995 |
| JP | 07-159615 A | 6/1995 |
| JP | 09-234825 A | 9/1997 |
| JP | 9-234825 A | 9/1997 |
| JP | 2003-327858 A | 11/2003 |
| JP | 2003327858 A * | 11/2003 |
| JP | 2004-528603 A | 9/2004 |
| JP | 2006-079030 A | 3/2006 |
| JP | 2006-323377 A | 11/2006 |
| WO | 02/099480 A1 | 12/2002 |
| WO | 2005-035667 A1 | 4/2005 |
| WO | 2006/115206 A1 | 11/2006 |

OTHER PUBLICATIONS

English machine translation of JP 2003-327858A, Oct. 2012.*
International Search Report for PCT/JP2008/069722, mailed on Jan. 20, 2009.
Chinese Office Action dated Feb. 22, 2012, issued in corresponding Chinese Patent Application No. 200880002420.6 (3 pages).
Taiwanese Office Action dated Jun. 15, 2012, issued in corresponding Taiwanese Patent Application No. 097142902 (4 pages).
Japanese Office Action dated Oct. 13, 2011, issued in corresponding Japanese Patent Application No. 2008-110902 (2 pages).

* cited by examiner

*Primary Examiner* — Gwendolyn Blackwell
*Assistant Examiner* — Ruiyun Zhang
(74) *Attorney, Agent, or Firm* — Westerman, Hattori, Daniels & Adrian, LLP

(57) ABSTRACT

A liquid crystalline coating solution which comprises: an azo compound represented by the following general formula (1); and a solvent to dissolve the azo compound:

[Chemical formula 1]

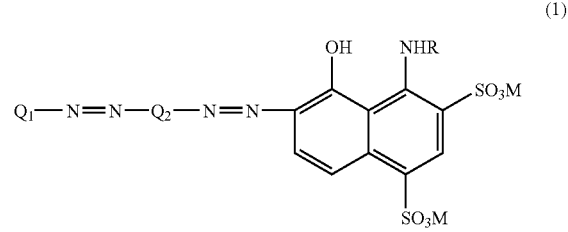

(1)

wherein $Q_1$ is an aryl group which may have any substituent group; $Q_2$ is an arylene group which may have any substituent group; R is a hydrogen atom, an alkyl group having 1 to 3 carbon atoms, an acetyl group, a benzoyl group, or a phenyl group (these groups may have any substituent groups); and M is a counter ion.

8 Claims, No Drawings

LIQUID CRYSTAL COATING SOLUTION, AND POLARIZING FILM

FIELD OF THE INVENTION

The present invention relates to a liquid crystalline coating solution and a polarizing film made from it.

BACKGROUND OF THE INVENTION

In a liquid crystal panel, a polarizing plate is used to control optical rotation of light beams that pass through liquid crystals. Conventionally, in such a polarizing plate, a polarizing plate obtained by dying a resin film, such as a polyvinyl alcohol or the like with iodine or a dichromatic dye and stretching the film in one direction has been widely used. However, there has been a problem that the aforementioned polarizing plate is poor in heat resistance and light resistance depending on the kind of the dye or the resin film. Moreover, film manufacturing equipment has become bigger as liquid crystal panels become bigger, which has become a problem.

In contrast, a method for forming a polarizing film by casting a liquid crystalline coating solution containing a lyotropic liquid crystal compound on a substrate, such as a glass plate or a resin film and the like to orient the lyotropic liquid crystal compound is known. The lyotropic liquid crystal compound forms supramolecular aggregates exhibiting liquid crystallinity in the solution, so that the long axis direction of the supramolecular aggregates is oriented in a flowing direction when flowing after applying shearing stress onto the liquid crystalline coating solution containing this. Examples of such lytropic liquid crystal compounds include azo compounds (JP 2006-323377 A). Lyotropic liquid crystal compounds based polarizing films do not need to be stretched and are easy to have a greater thickness because of no shrinkage in a width direction by stretching. Further, the lyotropic liquid crystal compounds based polarizing films are expected to have potential because the thickness can be reduced significantly.

However, the polarizing film obtained by casting a liquid crystalline coating solution including a conventional azo compound has a drawback that fine crystals are separated out in the film in a drying process, so that transparency is deteriorated due to an increase in haze (light scattering) of the polarizing film. Thus, a liquid crystalline coating solution including a novel azo compound which has resolved this problem has been demanded.

It is an object of the present invention in a polarizing film obtained from a liquid crystalline coating solution including an azo compound to provide a liquid crystalline coating solution including a novel azo compound which has resolved the drawback of the deteriorated transparency caused by an increase in haze (light scattering) of the polarizing film because of the separating of fine crystals in the film.

SUMMARY OF THE INVENTION

Inventors of the present invention carried out extensive investigations on separating of fine crystals in a liquid crystalline coating solution including an azo compound. As a result, they found out that it was possible to inhibit the separating by using an azo compound containing an amino naphthol skeleton in which a substituent group, such as a sulfonic acid group or the like is substituted in a specific position and to obtain a polarizing film having small haze.

The gist of the present invention is described as follows:

In a first preferred embodiment, a liquid crystalline coating solution according to the present invention comprises: an azo compound represented by the following general formula (1); and a solvent to dissolve the azo compound:

[Chemical formula 1]

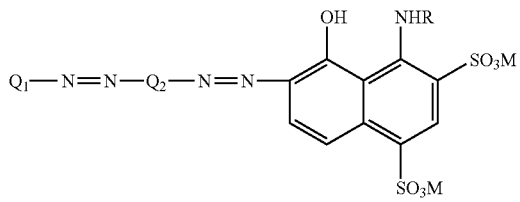

(1)

wherein $Q_1$ is an aryl group which may have any substituent group; $Q_2$ is an arylene group which may have any substituent group; R is a hydrogen atom, an alkyl group having 1 to 3 carbon atoms, an acetyl group, a benzoyl group, or a phenyl group (these groups may have any substituent groups); and M is a counter ion.

In a second preferred embodiment of a liquid crystalline coating solution according to the present invention, the azo compound has a concentration of 0.5 to 50% by weight.

In a third preferred embodiment, a liquid crystalline coating solution according to the present invention has a pH of 5 to 9.

In a fourth preferred embodiment, a polarizing film according to the present invention is obtained by casting the liquid crystalline coating solution in a thin film state.

ADVANTAGE OF THE INVENTION

In a polarizing film obtained by casting and drying a liquid crystalline coating solution including a novel azo compound, the separating of fine crystals in the film is inhibited in a drying process to obtain a polarizing film having small haze.

DESCRIPTION OF THE PREFERRED EMBODIMENTS

The separating of fine crystals is presumed to be inhibited when a liquid crystalline coating solution including the aforementioned azo compound of the present invention is cast and dried. As a result, the fine crystals that cause haze become far fewer than conventional one, which could result in a decrease in haze. In the liquid crystalline coating solution of the present invention, a sulfonic acid group is introduced into a specific position to make an aminonaphthol skeleton with high possibility of being a portion to be poor in solubility due to high flatness in a structure of an azo compound included therein to make the liquid crystalline coating solution easily dissolved, which could lead to inhibit the separating of the fine crystals.

[Liquid Crystalline Coating Solution]

A liquid crystalline coating solution of the present invention comprises: an azo compound represented by the following general formula (1); and a solvent to dissolve the azo compound.

[Chemical formula 1]

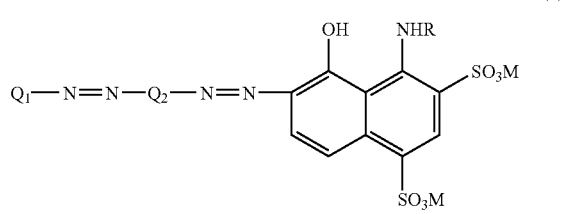

wherein $Q_1$ is an aryl group which may have any substituent group; $Q_2$ is an arylene group which may have any substituent group; R is a hydrogen atom, an alkyl group having 1 to 3 carbon atoms, an acetyl group, a benzoyl group, or a phenyl group (these groups may have any substituent groups); and M is a counter ion.

In the liquid crystalline coating solution of the present invention, the aforementioned azo compound forms supramolecular aggregates in the solution and exhibits a liquid crystal phase. The liquid crystal phase is not particularly limited, but examples of the liquid crystal phase include a nematic liquid crystal phase, a hexagonal liquid phase or the like. These liquid crystal phases can be identified and confirmed by observing optical patterns with a polarization microscope.

The aforementioned azo compound in the liquid crystalline coating solution of the present invention preferably has a concentration of 0.5 to 50% by weight. A liquid crystalline coating solution exhibiting a stable liquid crystal phase at least a portion of the concentration in the aforementioned range can be obtained, so that a polarizing film with a desired thickness (For example, 0.4 μm) can be easily obtained.

The liquid crystalline coating solution of the present invention preferably has a pH of 5 to 9. A polarizing film with high orientation degree can be obtained when the pH is in the above-mentioned range. And the liquid crystalline coating solution is superior in productivity because the coating solution does not cause a coater made of a metal, such as stainless steel or the like to corrode.

The liquid crystalline coating solution of the present invention may contain anything including the aforementioned specific azo compound and a solvent, for instance, the coating solution of the present invention may contain other liquid crystal compound or any additives. Examples of the additives include a surfactant, an antioxidant, an antistatic agent and the like. The concentration of the additives is generally less than 10% by weight.

While the method for preparing the liquid crystalline coating solution of the present invention is not particularly limited, the aforementioned azo compound may be added to the solvent, alternatively, the solvent may be added to the aforementioned azo compound.

[Azo Compound]

The azo compound to be used for the liquid crystalline coating solution of the present invention is a compound represented by the aforementioned general formula (1) and has a property (lyotropic liquid crystallinity) to cause a phase transition of an isotropic phase into a liquid crystal phase according to changes of the temperature and the concentration in a solution state dissolved in a solvent. The azo compound represented by the aforementioned general formula (1) exhibits absorption dichroism in a visible light region (at a wavelength of 380 to 780 nm). And the separating of fine crystals is inhibited because of having a substituent group, such as a sulfonic acid group in a specific position to obtain a polarizing film with small haze.

In the aforementioned formula (1), $Q_1$ is an aryl group which may have any substituent group; $Q_2$ is an arylene group which may have any substituent group, in which a substituent group suitable to adjust the width of the absorption wavelength is used.

In the aforementioned formula (1), R is a hydrogen atom, an alkyl group having 1 to 3 carbon atoms, an acetyl group, a benzoyl group or a phenyl group (these groups may have any substituent groups).

In the aforementioned formula (1), M is a counter ion and is preferably a hydrogen atom, an alkali metal atom, an alkali earth metal atom, a metal ion or a substituted or unsubstituted ammonium ion. Examples of a metal ion include, for instance, $Li^+$, $Ni^{2+}$, $Fe^{3+}$, $Cu^{2+}$, $Ag^+$, $Zn^{2+}$, $Al^{3+}$, $Pd^{2+}$, $Cd^{2+}$, $Sn^{2+}$, $Co^{2+}$, $Mn^{2+}$, or $Ce^{3+}$ and the like. When the counter ion M is a multivalent ion, a plurality of azo compounds share one multivalent ion (counter ion).

The aforementioned azo compound is preferably represented by the following general formula (2) or (3). In the formula (2) and (3), R and M are the same as those in the formula (1). X is a hydrogen atom, a halogen atom, a nitro group, a cyano croup, an alkyl group having 1 to 4 carbon numbers, an alkoxy group having 1 to 4 carbon numbers, or —$SO_3M$ group.

[Chemical formula 2]

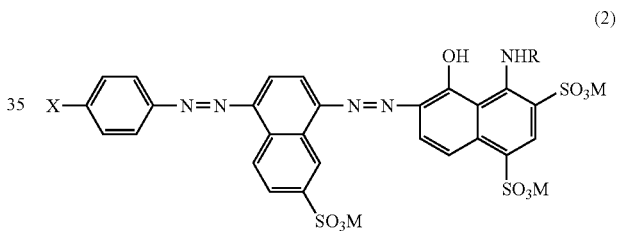

[Chemical formula 3]

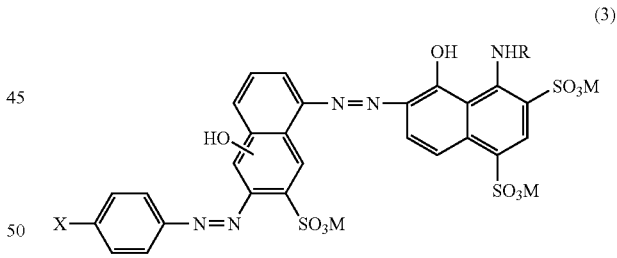

A monoazo compound is produced by diazotizing and coupling an aniline derivative and a naphthalene derivative in accordance with a conventional method and the obtained monoazo compound is subject to diazotization and coupling reaction with 1-amino-8-naphthol derivative to obtain an azo compound represented by the formula (1) and (2).

Solvents to be used in the present invention dissolve the aforementioned azo compounds and hydrophilic solvents are preferably used as solvents. The aforementioned hydrophilic solvents are preferably water, alcohol kinds, cellsolve kinds and mixture of thereof. Water-soluble compounds, such as glycerin, ethyleneglycol or the like may be added to the solvents. These additives can be used to control readily solubility and the drying rate of the liquid crystalline coating solution.

[Polarizing Film]

A polarizing film of the present invention can be obtained by casting the liquid crystalline coating solution of the present invention on the substrate or the surface of a metal drum and then being dried. While it is to be understood that the flow casting means of a liquid crystalline coating solution is not particularly limited, if only the liquid crystalline coating solution is uniformly cast. A flow casting means using an appropriate coater, for example, a slide coater, a slot die coater, a bar coater, a rod coater, a roll coater, a curtain coater, and a spray coater or the like is applied. While the drying means is not particularly limited, natural drying, reduced-pressure drying, drying by heating, and drying by heating under reduced pressure or the like may be used. Any drying methods using a drying apparatus, such as an air circulation-type drying oven or heated rolls and the like are used as drying by a heating means. The drying temperature in the case of drying by heating is preferably 50 to 120° C. The polarizing film of the present invention is preferably dried so that the amount of remaining solvent may be 5% by weight or lower with respect to the total weight.

The polarizing film of the present invention preferably exhibits absorption dichroism in a visible light region (at a wavelength of 380 to 780 nm). Such characteristics are obtained by the orientation of the aforementioned azo compound in the polarizing film. The aforementioned azo compound forms supramolecular aggregates in the liquid crystalline coating solution. Accordingly, the long axis direction of the supramolecular aggregates is oriented in the flowing direction by casting the liquid crystalline coating solution while applying shearing force to the liquid crystalline coating solution to flow. In addition to shearing force, an orientation means may combine orientation treatment, such as rubbing treatment and optical orientation or the like and orientation by a magnetic field and an electric field.

The polarizing film of the present invention preferably has a thickness of 0.1 to 3 μm. The polarization degree of the polarizing film of the present invention is preferably 90% or higher, more preferably 95% or higher. According to the present invention, the haze value of the polarizing film can be preferably set at 10% or lower, more preferably 5% or lower, further preferably 2% or lower.

While it is to be understood that a substrate for casting the liquid crystalline coating solution of the present invention is not particularly limited, a single layer or a plurality of laminates (for example, including an orientation film) may be used. Examples of the specific substrate include a glass plate and a resin film. When the substrate includes an orientation film, the orientation film is preferably treated with orientation. Examples of the substrate including an orientation film include a substrate made by coating a polyimide film on a glass plate. Orientation property is given to the polyimide film by a known method, for example, by mechanical orientation treatment, such as rubbing or the like and optical orientation treatment or the like. An alkali-free glass to be used for a liquid crystal cell is preferably used as a substrate glass. A resin film substrate is preferably used for the uses that require flexibility. The surface of the resin film may be orientation treated by rubbing or the like. Alternatively, an orientation film composed of other materials may be formed on the surface of the resin film. While materials of the resin film used for the substrate are not particularly limited, only if the materials are resins having film forming properties, examples of the materials include stylene resins, (meta) acrylic acid resins, polyester resins, polyolefin resins, norbornene resins, polyimide resins, cellulose resins, polyvinyl alcohol resins, and polycarbonate resins or the like. Although the thickness of the substrate is not particularly limited except for its application, the thickness is generally in the range between 1 to 1,000 μm.

[Applications of Polarizing Film]

The polarizing film of the present invention is preferably used as a polarizer. The polarizer is applied to liquid crystal display apparatuses, such as office automation appliances, such as personal computer monitors, laptop computers, copy machines or the like, portable devices, such as mobile phones, watches, digital cameras, Personal Digital Assistance (PDA), portable game devices or the like, home appliances, such as video cameras, television units, and microwave oven or the like, car appliances, such as rear-view mirrors, monitors for car navigation system, and car audio videos or the like, displays, such as monitors for information for stores, and security gizmos, such as supervisory monitors, care giving monitors, and monitors for medical purposes or the like. The polarizing film of the present invention may be used after being released from the substrate or may be used in the state that the polarizing film is laminated on the substrate. When the polarizing film is used for an optical application while the polarizing film is laminated on the substrate, the substrate is preferably transparent to visible light. The polarizing film may be used in the state of being laminated on other support or an optical element when the polarizing film is released from the substrate.

EXAMPLES

The present invention will be more clearly understood by referring to the Examples below. However, the Examples should not be construed to limit the invention in any way.

Example 1

In accordance with a conventional method ("Riron Seizo Senryo Kagaku" Fifth Edition (Theoretical production Dye Chemistry), Yutaka Hosoda (published on Jul. 15, 1968, GIHODO SHUPPAN Co., Ltd.), pages 135 to 152), a monoazo compound was produced by diazotizing and coupling 4-nitroaniline and 8-amino-2-naphthalene sulfonic acid. The obtained monoazo compound was diazotized by a conventional method in the same manner and was further subject to diazotization and coupling reaction with 1-amino-8-naphthol-2,4-disulfonate lithium salt to obtain a rough product including an azo compound having the following structural formula (4) and salting out was carried out with lithium chloride to obtain an azo compound having the following structural formula (4):

[Chemical formula 4]

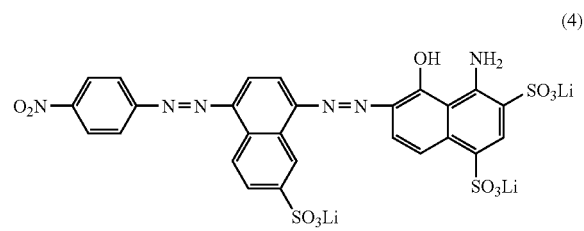

(4)

The azo compound of the aforementioned structural formula (4) was dissolved in ion-exchange water to prepare a liquid crystalline coating solution of 20% by weight. The liquid crystalline coating solution had a pH of 7.8. The liquid crystalline coating solution was obtained with a poly dropper and was sandwiched by two pieces of slide glasses. A nematic liquid crystal phase was observed when observing with a polarization microscope at room temperature (23° C.).

The aforementioned liquid crystalline coating solution was cast by flowing on the surface of a norbornene polymer film (produced by Nippon Zeon Co., Ltd., product name "Zeonor") with rubbing treatment and corona treatment in a thin film state using a bar coater (produced by BUSCHMAN, product name "Mayer rot HS4") to obtain a polarizing film with a thickness of 0.4 μm by natural drying in a temperature-controlled room at 23° C. Optical characteristics of the obtained polarizing film are indicated in Table 1.

Example 2

A compound of the following structural formula (5) was obtained in the same manner as in Example 1 except for changing 4-nitroaniline to p-anisidine.

[Chemical formula 5]

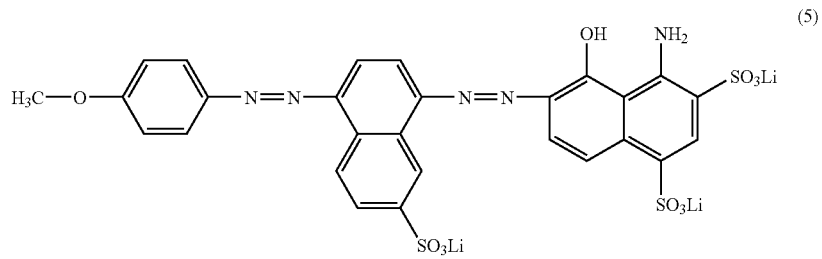

(5)

The azo compound of the aforementioned structural formula (5) was dissolved in ion-exchange water to prepare a liquid crystalline coating solution of 20% by weight. The liquid crystalline coating solution had a pH of 7.5. The liquid crystalline coating solution was obtained with a poly dropper and was sandwiched by two pieces of slide glasses. A nematic liquid crystal phase was observed when observing with a polarization microscope at room temperature (23° C.). The aforementioned liquid crystalline coating solution was further diluted using ion-exchange water to prepare the solution so as to be 10% by weight. The liquid crystalline coating solution was used to prepare a polarizing film with a thickness of 0.6 μm in the same manner as in Example 1. Optical characteristics of the obtained polarizing film are indicated in Table 1.

Example 3

A compound of the following structural formula (6) was obtained in the same manner as in Example 1 except for changing 4-nitroaniline to p-toluidine.

[Chemical formula 6]

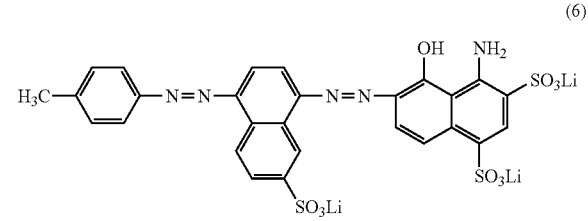

(6)

The azo compound of the aforementioned structural formula (6) was dissolved in ion-exchange water to prepare a liquid crystalline coating solution of 20% by weight. The liquid crystalline coating solution had a pH of 7.5. The liquid crystalline coating solution was obtained with a poly dropper and was sandwiched by two pieces of slide glasses. A nematic liquid crystal phase was observed when observing with a polarization microscope at room temperature (23° C.). The aforementioned liquid crystalline coating solution was further diluted using ion-exchange water to prepare the solution so as to be 10% by weight. The liquid crystalline coating solution was used to prepare a polarizing film with a thickness of 0.6 μm in the same manner as in Example 1. Optical characteristics of the obtained polarizing film are indicated in Table 1.

Example 4

A compound of the following structural formula (7) was obtained in the same manner as in Example 1 except for changing 8-amino-2-naphthalene sulfonic acid to 5-amino-1-naphthol-3-sulfonate hydrate.

[Chemical formula 7]

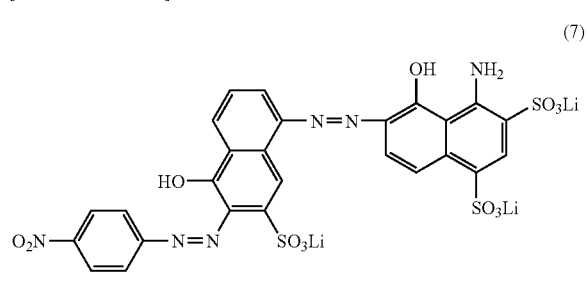

(7)

The azo compound of the aforementioned structural formula (7) was dissolved in ion-exchange water to prepare a liquid crystalline coating solution of 20% by weight. The liquid crystalline coating solution had a pH of 8.3. The liquid crystalline coating solution was obtained with a poly dropper and was sandwiched by two pieces of slide glasses. A nematic liquid crystal phase was observed when observing with a polarization microscope at room temperature (23° C.). The aforementioned liquid crystalline coating solution was further diluted using ion-exchange water to prepare the solution so as to be 5% by weight. The liquid crystalline coating solution was used to prepare a polarizing film with a thickness of 0.6 μm in the same manner as in Example 1 except for using a bar coater (produced by BUSCHMAN, product name "Mayer rot HS4"). Optical characteristics of the obtained polarizing film are indicated in Table 1.

Comparative Example 1

An azo compound of the following structural formula (8) was obtained in the same manner as in Example 1 except for changing 1-amino-8-naphthol-2,4-disulfonate lithium salt to 7-amino-1-naphthol 3,6-disulfonate lithium salt.

[Chemical formula 8]

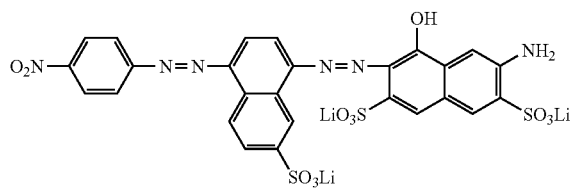

(8)

The azo compound of the aforementioned structural formula (8) was dissolved in ion-exchange water to prepare a liquid crystalline coating solution of 20% by weight. The liquid crystalline coating solution had a pH of 6.7. The liquid crystalline coating solution was obtained with a poly dropper and was sandwiched by two pieces of slide glasses. A nematic liquid crystal phase was observed when observing with a polarization microscope at room temperature (23° C.). The liquid crystalline coating solution was used to prepare a polarizing film with a thickness of 0.8 μm in the same manner as in Example 1. Optical characteristics of the obtained polarizing film are indicated in Table 1.

Comparative Example 2

A compound of the following structural formula (9) was obtained in the same manner as in Example 1 except for changing 4-nitroaniline to p-anisidine.

[Chemical formula 9]

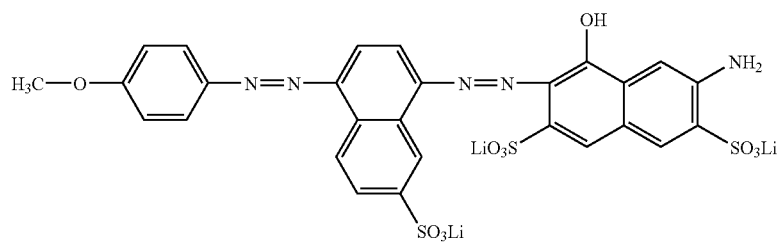

(9)

The azo compound of the aforementioned structural formula (9) was dissolved in ion-exchange water to prepare a liquid crystalline coating solution of 20% by weight. The liquid crystalline coating solution had a pH of 6.0. The liquid crystalline coating solution was obtained with a poly dropper and was sandwiched by two pieces of slide glasses. A nematic liquid crystal phase was observed when observing with a polarization microscope at room temperature (23° C.). The aforementioned liquid crystalline coating solution was further diluted using ion-exchange water to prepare the solution so as to be 10% by weight. The liquid crystalline coating solution was used to prepare a polarizing film with a thickness of 0.6 μm in the same manner as in Example 1. Optical characteristics of the obtained polarizing film are indicated in Table 1.

Comparative Example 3

A compound of the following structural formula (10) was obtained in the same manner as in Example 1 except for changing 4-nitroaniline to p-toluidine.

[Chemical formula 10]

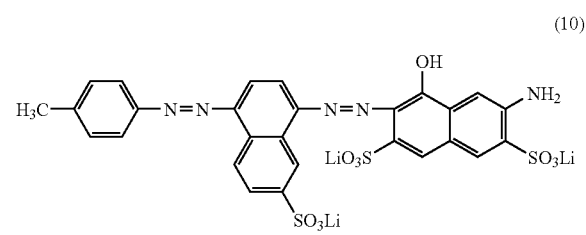

(10)

The azo compound of the aforementioned structural formula (10) was dissolved in ion-exchange water to prepare a liquid crystalline coating solution of 20% by weight. The liquid crystalline coating solution had a pH of 6.0. The liquid crystalline coating solution was obtained with a poly dropper and was sandwiched by two pieces of slide glasses. A nematic liquid crystal phase was observed when observing with a polarization microscope at room temperature (23° C.). The aforementioned liquid crystalline coating solution was further diluted using ion-exchange water to prepare the solution so as to be 10% by weight. The liquid crystalline coating solution was used to prepare a polarizing film with a thickness of 0.6 μm in the same manner as in Example 1. Optical characteristics of the obtained polarizing film are indicated in Table 1.

TABLE 1

|  | Compound | Polarization degree (%) | Haze value (%) |
| --- | --- | --- | --- |
| Example 1 | Compound (4) | 98.0 | 1.8 |
| Example 2 | Compound (5) | 99.7 | 0.9 |
| Example 3 | Compound (6) | 98.8 | 0.7 |
| Example 4 | Compound (7) | 97.7 | 1.2 |
| Comparative Example 1 | Compound (8) | 98.1 | 12.3 |
| Comparative Example 2 | Compound (9) | 92.5 | 17.9 |
| Comparative Example 3 | Compound (10) | 92.7 | 16.5 |

[Measurement Method]

[Observation of Liquid Crystal Phase]

The liquid crystalline coating solution was obtained using a poly dropper and was sandwiched by two pieces of slide glasses (produced by Matsunami Glass Ind. Ltd., product name: "MATSUNAMI SLIDE GLASS") to observe using a polarization microscope (manufactured by Olympus, product name: "OPTIPHOT-POL").

[Measurement of pH]

The pH value of the liquid crystalline coating solution was measured using a pH meter (produced by DENVER INSTRUMENT, product name: "Ultra BASIC").

[Measurement of Thickness of a Polarizing Film]

A portion of a polarizing film was released to obtain the thickness of the polarizing film by measuring the level difference using a three-dimensional measurement system of the shape of a non-contact surface (manufactured by Ryoka Systems, Inc., product name: "MM5200").

[Measurement of Polarization Degree]

Polarization transmission spectrum was measured in a range at a wavelength of 380 to 780 nm using a spectrophotometer (produced by JASCO Corporation, product name: V-7100). The transmittance $Y_1$ of linear polarization in a maximum transmittance direction in which visibility amendment was performed from this spectrum and the transmittance $Y_2$ in a direction that is orthogonal to it were obtained to obtain the polarization degree from an equation: polarization degree=$(Y_1-Y_2)/(Y_1+Y_2)$.

[Measurement of Haze]

Haze was measured at room temperature (23° C.) using a haze meter (produced by MURAKAMI COLOR RESEARCH LABORATORY, product name: HR-100). A mean value of three repeated frequency was taken as a measuring value.

There have thus been shown and described a novel liquid crystalline coating solution, and a novel polarizing film, which fulfill all the objects and advantages sought therefor. Many changes, modifications, variations, combinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit or scope of the invention are deemed to be covered by the invention, which is to be limited only by the claims which follow.

What is claimed is:

1. A liquid crystalline coating solution comprising:
    an azo compound represented by the following general formula (11); and
    a solvent to dissolve the azo compound:

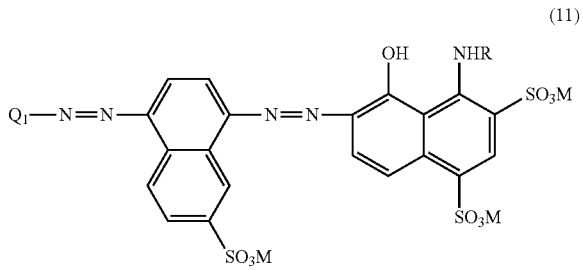

(11)

wherein $Q_1$ is an aryl group which has any substituent group; R is a hydrogen atom, an alkyl group having 1 to 3 carbon atoms, an acetyl group, a benzoyl group, or a phenyl group (these groups have any substituent groups); and M is a counter ion.

2. The liquid crystalline coating solution according to claim 1, wherein the azo compound has a concentration of 0.5 to 50% by weight.

3. The liquid crystalline coating solution according to claim 1, wherein the liquid crystalline coating solution has a pH of 5 to 9.

4. A polarizing film obtained by casting the liquid crystalline coating solution according to claim 1 in a thin film state.

5. A liquid crystalline coating solution comprising:
    an azo compound represented by the following general formula (12); and
    a solvent to dissolve the azo compound:

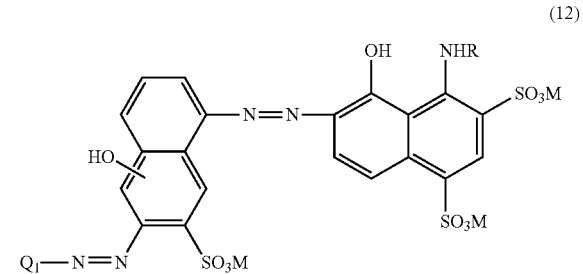

(12)

wherein $Q_1$ is an aryl group, which has any substituent group; R is a hydrogen atom, an alkyl group having 1 to 3 carbon atoms, an acetyl group, a benzoyl group, or a phenyl group (these groups have any substituent groups); and M is a counter ion.

6. The liquid crystalline coating solution according to claim 5, wherein the azo compound has a concentration of 0.5 to 50% by weight.

7. The liquid crystalline coating solution according to claim 5, wherein the liquid crystalline coating solution has a pH of 5 to 9.

8. A polarizing film obtained by casting the liquid crystalline coating solution according to claim 5 in a thin film state.

* * * * *